May 10, 1938. R. G. HANNEMAN 2,116,928
GRIPPING IMPLEMENT
Filed Oct. 19, 1936
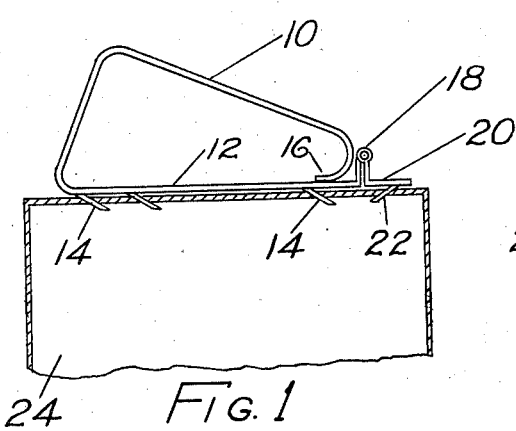
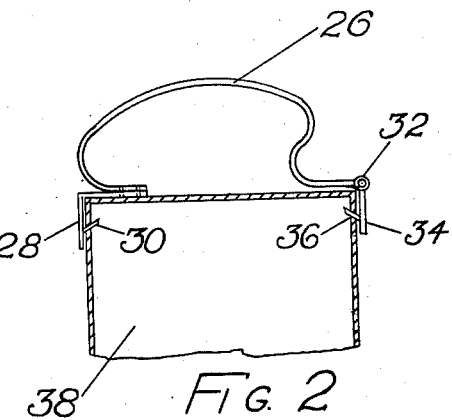
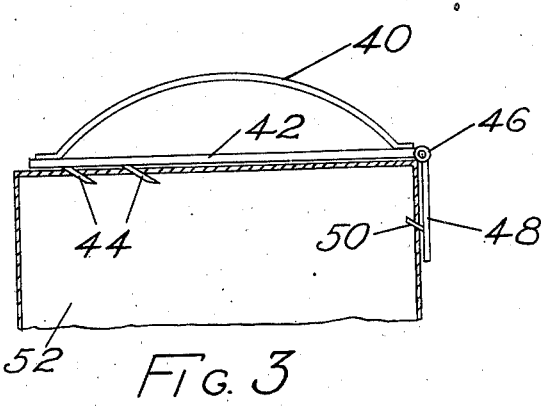
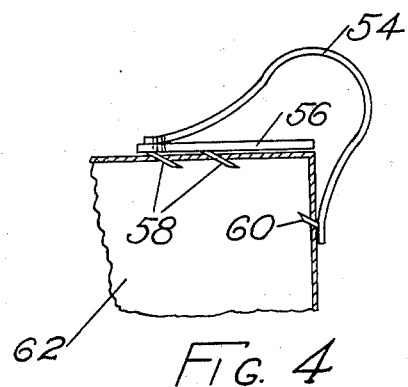
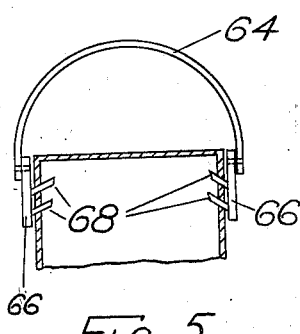
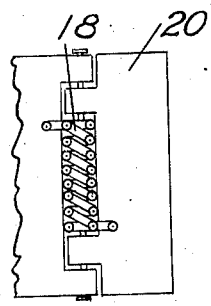
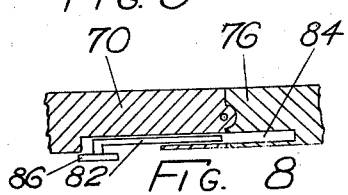
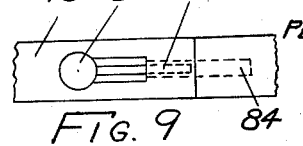
ROBERT G. HANNEMAN
INVENTOR
PER
ATTORNEY Patented May 10, 1938

2,116,928

UNITED STATES PATENT OFFICE 2,116,928

GRIPPING IMPLEMENT

Robert G. Hanneman, Chicago, Ill.

Application October 19, 1936, Serial No. 106,354

3 Claims. (Cl. 294—27)

This invention relates to an improved gripping implement, and has, for one of its principal objects, the provision of a device which can be readily applied as a handle to various objects, particularly boxes of cardboard or the like.

One of the important objects of this invention is to provide a gripping implement which is economically manufactured, readily operated, simple of construction, and which, furthermore, is capable of a wide variety of uses.

Another and further important object of the invention is the provision, in a gripping implement, of a unitary device having integral pointed extensions or the like which penetrate into the object or material to be gripped and which will firmly retain the same as long as required.

Other and further important objects of the invention will be apparent from the disclosures in the accompanying drawing and following specification.

The invention, in a preferred form, is shown in the drawing and hereinafter more fully described.

In the drawing:

Figure 1 is a side elevation of the improved gripping implement of this invention, showing the same as applied to a box or similar package.

Figure 2 is a similar side view, illustrating a slight modification of the invention.

Figure 3 is a still further modification.

Figure 4 illustrates an additional modified form.

Figure 5 is a view of a still further embodiment of the invention.

Figure 6 illustrates a device made in accordance with the invention which is adapted for heavier work.

Figure 7 is a top plan view of a portion of the apparatus, and may be applicable to either Figure 1, 2 or 3.

Figure 8 is an enlarged detail view of part of the construction shown in Figure 6.

Figure 9 is a bottom plan view of that portion of the apparatus illustrated in Figure 8.

As shown in the drawing:

The reference numeral 10 indicates generally the handle portion of the improved gripping implement of this invention, and the same may be of metal or some other suitable material bent or formed to shape as shown and having an integral flat portion 12 from which extends struck-out penetrating tangs or the like 14 which are preferably pointed as shown. The inwardly turned end portion 16 of the handle 10 may be spot-welded, soldered, or otherwise affixed to the corresponding flat portion 12.

Beyond the in-turned end of the handle, the flat portion is turned upwardly as illustrated and terminates in a spring-hinged construction 18 which includes an extension 20 also having pointed projections or tangs 22 which penetrate the material of the box 24, and it will be evident that this provides a secure gripping of the corresponding portions with the result that the box itself can be lifted and transported from place to place in a very simple manner.

The modification illustrated in Figure 2 includes a handle 26 riveted, spot-welded or the like at one end to a right-angled portion 28 which has projections or the like 30 extending inwardly therefrom, and a spring hinge 32 attaches another plate element or the like 34 to the corresponding opposed end of the handle 26. This element is, of course, also provided with tangs or the like 36. In this manner, suitable penetration, gripping and holding of a box or the like 38 is assured.

A third modification is illustrated in Figure 3 wherein the handle 40 is spot-welded or otherwise affixed to a flat portion 42, this flat portion having inwardly struck tangs or points 44 at one end thereof, while, at the other end, the usual spring hinge is provided by means of which a plate 48 having integral projections 50 is attached to the main handle portion for suitable penetration or cooperation with a box or other container 52.

A fourth modification and one which is essentially quite simple embodies a spring handle 54 as illustrated in Figure 4, this being attached, in any suitable manner, to a base plate or the like 56 from which tangs or projections 58 extend, and the handle itself, at its opposite end, is provided with in-turned or inwardly struck projections or points 60. Here again the action with regard to a box or the like is obvious.

Another spring handle construction is illustrated at 64 in Figure 5, this handle having a pair of plates 66, one attached at each end, each plate provided with projections or points 68.

A more rugged and heavier embodiment is illustrated in Figure 6 wherein a handle 70 in the form of a metal casting or the like is employed, this having integral or attached extension 72, one end of the handle together with the corresponding end of the extension being provided with penetrating elements 74.

The other end of the handle terminates in a hinged extension 76 having penetrating points 78, and a locked hinge device 80 is provided. This is more clearly illustrated in Figures 8 and 9, the locking element comprising a pin or the like 82 slidably mounted in suitable slots or grooves 84 in the handle portions and provided with a pushbutton or the like 86 for operating purposes. This is also illustrated in Figure 9.

It will be obvious that herein is provided a simple, yet efficient, gripping implement which, in some cases, can be applied to a wide range of boxes or containers, and which, in other cases, is restricted, at least to some extent, to a particular size of box, but, in that event, the gripping implement itself can be made of different sizes so as to meet varying or various conditions.

A device of this sort is especially useful in kitchens or the like where containers for various food products are employed and used in many instances throughout the day and wherein handles of this type render the use of these packages much more economical and convenient. Furthermore, manufacturers of the various products distributed in these containers may oftentimes provide one of these handles for a special size or make of container whereby purchasers of the particular product will be accelerated.

I am aware that many changes may be made and numerous details of construction varied throughout a wide range without departing from the principles of this invention, and I, therefore, do not purpose limiting the patent granted hereon otherwise than as necessitated by the prior art.

I claim as my invention:

1. A gripping device, including a handle, penetrating prongs on the handle, an extension hingedly mounted on the handle remote from the prongs, and additional penetrating prongs on the extension, together with a spring element in said hinged construction, and locking means in the hinge.

2. A gripping device, including a handle, penetrating prongs on the handle, an extension hingedly mounted on the handle remote from the prongs, and additional penetrating prongs on the extension, together with a spring element in said hinged construction, and locking means in the hinge, said locking means including a slidable pin.

3. A gripping device, including a handle, penetrating prongs on the handle, an extension hingedly mounted on the handle remote from the prongs, and additional penetrating prongs on the extension, together with a spring element in said hinged construction, and locking means in the hinge, said locking means including a slidable pin operating in aligned channels in the handle and said hinged element.

ROBERT G. HANNEMAN.